(12) United States Patent
Niino et al.

(10) Patent No.: US 11,498,994 B2
(45) Date of Patent: Nov. 15, 2022

(54) BLOCK COPOLYMER COMPOSITION AND PRODUCTION METHOD THEREFOR

(71) Applicants: Mitsubishi Chemical Corporation, Chiyoda-ku (JP); Nanyang Technological University, Singapore (SG)

(72) Inventors: Hiroshi Niino, Tokyo (JP); Shunsuke Chatani, Tokyo (JP); Shuyao Hsu, Tokyo (JP); Atsushi Goto, Nanyang Avenue (SG); Longqiang Xiao, Nanyang Avenue (SG); Jun Jie Chang, Nanyang Avenue (SG)

(73) Assignees: Mitsubishi Chemical Corporation, Chiyoda-ku (JP); Nanyang Technological University, Singapore (SG)

( * ) Notice: Subject to any disclaimer, the term of this patent is extended or adjusted under 35 U.S.C. 154(b) by 93 days.

(21) Appl. No.: 16/766,545

(22) PCT Filed: Nov. 22, 2018

(86) PCT No.: PCT/JP2018/043189
§ 371 (c)(1),
(2) Date: May 22, 2020

(87) PCT Pub. No.: WO2019/103102
PCT Pub. Date: May 31, 2019

(65) Prior Publication Data
US 2020/0377638 A1 Dec. 3, 2020

(30) Foreign Application Priority Data

Nov. 24, 2017 (JP) .............................. JP2017-226326
May 11, 2018 (JP) .............................. JP2018-092436
Aug. 17, 2018 (JP) .............................. JP2018-153588

(51) Int. Cl.
*C08F 287/00* (2006.01)

(52) U.S. Cl.
CPC ........ *C08F 287/00* (2013.01); *C08F 2410/01* (2013.01)

(58) Field of Classification Search
CPC .................................................... C08F 287/00
See application file for complete search history.

(56) References Cited

U.S. PATENT DOCUMENTS

| | | | | |
|---|---|---|---|---|
| 4,399,260 A * | 8/1983 | Carson | ................ | C08F 297/044 525/379 |
| 4,680,352 A * | 7/1987 | Janowicz | ................ | C08F 2/38 526/329.2 |
| 5,912,315 A * | 6/1999 | Horiie | ................ | C08F 291/00 264/45.9 |
| 2007/0068233 A1 * | 3/2007 | Lewtas | ................ | C09J 153/025 73/104 |
| 2007/0231737 A1 * | 10/2007 | Sugasaki | ................ | C08F 8/50 430/270.1 |
| 2010/0081769 A1 * | 4/2010 | Ma | ................ | C09B 67/009 525/227 |
| 2011/0144263 A1 | 6/2011 | Ma | | |
| 2016/0185893 A1 | 6/2016 | Oonuma et al. | | |
| 2016/0237192 A1 | 8/2016 | Fujiyama et al. | | |
| 2016/0264720 A1 * | 9/2016 | Schulte | ................ | C08G 61/00 |
| 2017/0037286 A1 | 2/2017 | Lee et al. | | |
| 2017/0255096 A1 * | 9/2017 | Osaki | ................ | C09D 133/02 |
| 2017/0335027 A1 * | 11/2017 | Soddu | ................ | C08F 36/06 |

FOREIGN PATENT DOCUMENTS

| | | |
|---|---|---|
| CN | 1306546 A | 8/2001 |
| CN | 101410420 A | 4/2009 |
| CN | 106232760 A | 12/2016 |
| CN | 106661161 A | 5/2017 |
| EP | 1 160 266 A1 | 12/2001 |
| EP | 3 459 979 A1 | 3/2019 |
| JP | 2007-254758 A | 10/2007 |
| JP | 2009-298989 A | 12/2009 |
| JP | 2017-515940 A | 6/2017 |

(Continued)

OTHER PUBLICATIONS

International Search Report dated Feb. 12, 2019 in PCT/JP2018/043189 filed on Nov. 22, 2018, citing documents AB-AD, AP, AR and AS-AV therein, 7 pages.
Extended European Search Report dated Mar. 5, 2021 in corresponding European Patent Application No. 18881910.6, 11 pages.
Partial Supplementary European Search Report dated Dec. 1, 2020 in European Patent Application No. 18881910.6, citing documents AO and AP therein, 13 pages.
Office Action dated Feb. 8, 2022 in corresponding Japanese Patent Application No. 2019-555366 (with English Translation), 14 pages.
Office Action dated Feb. 18, 2022 in corresponding Indonesian Patent Application No. P00202004566 (with English Translation), 8 pages.
Office Action dated Aug. 19, 2022 in Chinese Patent Application No. 201880074800.4 (with machine Translation), 19 pages.
Office Action dated Aug. 30, 2022 in Japanese Patent Application No. 2019-555366 (with machine Translation).

(Continued)

*Primary Examiner* — Jeffrey C Mullis
(74) *Attorney, Agent, or Firm* — Oblon, McClelland, Maier & Neustadt, L.L.P.

(57) ABSTRACT

Provided is a block copolymer composition which contains a block copolymer having a specific molecular structure and has a molecular weight distribution within an appropriate range. A polymerizable composition containing a macromonomer (A) which has a group having a radical-reactive unsaturated double bond at one terminal of a poly(meth)acrylate segment, a vinyl monomer (B), and an organic iodine compound (C), or a polymerizable composition containing a macromonomer (A), a vinyl monomer (B), an azo-based radical polymerization initiator (E), and iodine is polymerized to obtain a block copolymer composition containing a block copolymer in which constitutional units of all blocks are derived from vinyl monomers and at least one block has a branched structure.

20 Claims, No Drawings

(56) References Cited

FOREIGN PATENT DOCUMENTS

| | | |
|---|---|---|
| KR | 10-0483088 B1 | 9/2005 |
| WO | WO 97/31031 A1 | 8/1997 |
| WO | WO 2014/098141 A1 | 6/2014 |
| WO | WO 2015/056668 A1 | 4/2015 |
| WO | WO 2017/199562 A1 | 11/2017 |

* cited by examiner

BLOCK COPOLYMER COMPOSITION AND PRODUCTION METHOD THEREFOR

TECHNICAL FIELD

The present invention relates to a block copolymer composition and a production method therefor.

Priority is claimed on Japanese Patent Application No. 2017-226326, filed November 24, 2017, Japanese Patent Application No. 2018-092436, filed May 11, 2018, and Japanese Patent Application No. 2018-153588, filed Aug. 17, 2018, the contents of which are incorporated herein by reference.

BACKGROUND ART

A polymer obtained by polymerizing vinyl monomers is used for various applications, and particularly for the purpose of responding to requirements of various physical properties, a copolymer obtained by copolymerizing two or more kinds of vinyl monomers is widely used. However, when two or more kinds of vinyl monomers are mixed and copolymerized, properties of respective monomer units are averaged, and thus it tends to be difficult to obtain desired physical properties. Even when two or more kinds of polymers are mixed, these polymers are not uniformly mixed, and thus properties of a monomer unit of each polymer cannot be sufficiently exhibited in many cases.

A block copolymer is known as a copolymer in which properties of each monomer unit are easily exhibited. Since the block copolymer cannot be obtained by ordinary radical polymerization, a living anionic polymerization method, a living radical polymerization method, or the like is used. According to the living anionic polymerization method, the living radical polymerization method, or the like, a block copolymer can be produced while controlling a molecular weight and a molecular weight distribution, and a block copolymer having a narrow molecular weight distribution is obtained. However, since a special compound or a metal catalyst is used for the polymerization, a step of removing the compound or the catalyst is required, which is industrially complicated.

As a method for producing a block copolymer, a method using a macromonomer which is a high-molecular-weight monomer having a radical-reactive functional group is also known (for example, Patent Document 1). However, a molecular structure or a molecular weight distribution is difficult to be controlled by the method using a macromonomer.

CITATION LIST

Patent Literature

[Patent Literature 1]
PCT International Publication No. WO2015/056668

SUMMARY OF INVENTION

Technical Problem

An object of the present invention is to provide a block copolymer composition which contains a block copolymer having a specific molecular structure.

Another object of the present invention is to provide a block copolymer composition which contains a block copolymer having a specific molecular structure and has a molecular weight distribution within an appropriate range.

Still another object of the present invention is to provide a method for producing a block copolymer composition in which a molecular structure or a molecular weight distribution can be sufficiently controlled.

Solution to Problem

The present invention has the following configuration.

[1] A block copolymer composition containing a block copolymer in which constitutional units of all blocks are derived from vinyl monomers, at least one block has a branched structure, and a main chain and a branched chain consist of the same constitutional unit.

[2] A block copolymer composition containing a block copolymer in which constitutional units of all blocks are derived from vinyl monomers and at least one block has a branched structure, in which a molecular weight distribution (Mw/Mn) is 1.5 to 3.4.

[3] The block copolymer composition as described in [2], in which a main chain and a branched chain of the branched structure consist of the same constitutional unit.

[4] The block copolymer composition as described in any one of [1] to [3], in which a constitutional unit of at least one block is derived from a methacrylate-based monomer or an acrylate-based monomer.

[5] The block copolymer composition as described in any one of [1] to [4], in which the block copolymer has an iodine atom at a terminal of a main chain.

[6] The block copolymer composition as described in any one of [1] to [5], in which a number-average molecular weight Mn is 3,000 or more.

[7] A block copolymer composition containing a block copolymer, in which the block copolymer composition is obtained by polymerizing a polymerizable composition which contains a macromonomer (A) represented by Formula (I), a vinyl monomer (B), and an organic iodine compound (C).

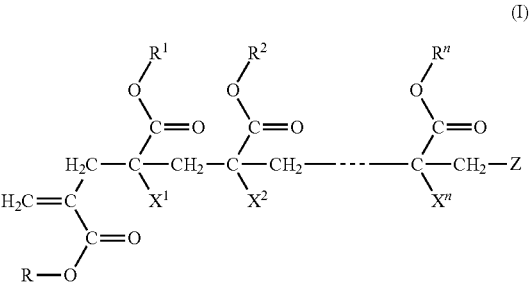

(In Formula (I), R and $R^1$ to $R^n$ are each independently a hydrogen atom, an alkyl group, a cycloalkyl group, an aryl group, or a heterocyclic group. Z is a hydrogen atom or a group derived from a radical polymerization initiator. $X^1$ to $X^n$ are each independently a hydrogen atom or a methyl group. n is an integer of 2 to 10,000.)

[8] The block copolymer composition as described in [7], in which a block copolymer in which a block derived from the vinyl monomer (B) has a branched structure and a main chain and a branched chain consist of the same constitutional unit is contained.

[9] The block copolymer composition as described in [7] or [8], in which a block copolymer in which a block derived from the vinyl monomer (B) has a branched structure is contained, and a molecular weight distribution is 1.5 to 3.4.

[10] The block copolymer composition as described in any one of [7] to [9], in which the block copolymer has an iodine atom at a terminal of a main chain.

[11] The block copolymer composition as described in any one of [7] to [10], in which the vinyl monomer (B) is at least one monomer selected from the group consisting of a styrene-based monomer, a methacrylate-based monomer, and an acrylate-based monomer.

[12] A method for producing a block copolymer composition, including polymerizing a polymerizable composition which contains a macromonomer (A) represented by Formula (I), a vinyl monomer (B), and an organic iodine compound (C).

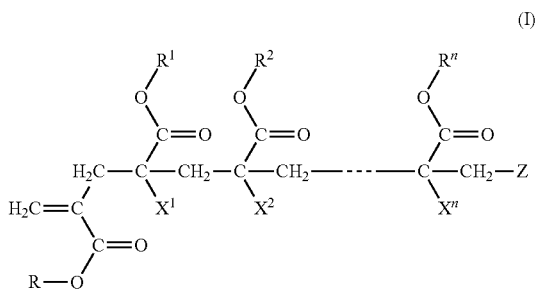

(In Formula (I), R and $R^1$ to $R^n$ are each independently a hydrogen atom, an alkyl group, a cycloalkyl group, an aryl group, or a heterocyclic group. Z is a hydrogen atom or a group derived from a radical polymerization initiator. $X^1$ to $X^n$ are each independently a hydrogen atom or a methyl group. n is an integer of 2 to 10,000.)

[13] The method for producing a block copolymer composition as described in [12], in which the polymerizable composition further contains one or both of a catalyst (D) and an azo-based radical polymerization initiator (E).

[14] A method for producing a block copolymer composition, including polymerizing a polymerizable composition which contains a macromonomer (A) represented by Formula (I), a vinyl monomer (B), an azo-based radical polymerization initiator (E), and iodine.

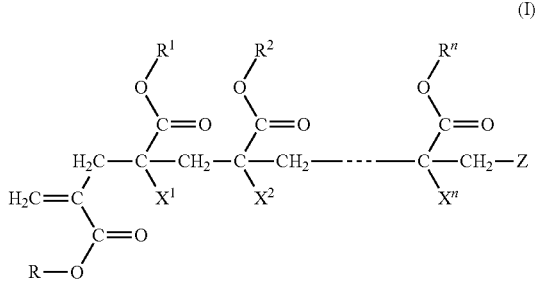

(In Formula (I), R and $R^1$ to $R^n$ are each independently a hydrogen atom, an alkyl group, a cycloalkyl group, an aryl group, or a heterocyclic group. Z is a hydrogen atom or a group derived from a radical polymerization initiator. $X^1$ to $X^n$ are each independently a hydrogen atom or a methyl group. n is an integer of 2 to 10,000.)

[15] The method for producing a block copolymer composition as described in [14], in which the polymerizable composition further contains a catalyst (D).

[16] The method for producing a block copolymer composition as described in [14], in which at least one of Expressions (i) and (ii) is satisfied.

$$0<[Q]/[P]<0.60 \quad \text{(i)}$$

(Here, [P] represents a molar equivalent number of the azo-based radical polymerization initiator (E), and [Q] represents a molar equivalent number of the iodine.)

$$0<Tp-T_{10}<40 \quad \text{(ii)}$$

(Here, Tp represents a polymerization temperature (° C.) at which the polymerizable composition is polymerized, and $T_{10}$ represents a 10-hour half-life temperature (° C.) of the azo-based radical polymerization initiator (E).)

[17] The method for producing a block copolymer composition as described in [13] or [15], in which the catalyst (D) is at least one catalyst selected from the group consisting of the following catalysts (D1) to (D6).

Catalyst (D1): a non-metal compound containing a halide ion and a non-metal atom which is in a cationic state and forms an ionic bond with the halide ion Catalyst (D2): a compound containing a carbon atom and at least one halogen atom directly bonded to the carbon atom, or a hydrocarbon compound serving as a precursor of the compound Catalyst (D3): an organic compound having a nitrogen atom, a phosphorus atom, a sulfur atom, or an oxygen atom and having redox properties Catalyst (D4): a compound selected from the group consisting of ethylene, acetylene, oligoacetylene, polyacetylene, fullerene, carbon nanotube, and derivatives thereof Catalyst (D5): an alkali metal halide compound or an alkaline earth metal halide compound Catalyst (D6): a compound selected from the group consisting of a phosphorus compound, a nitrogen-containing compound, and an oxygen-containing compound other than the catalysts (D1) to (D5)

[18] The method for producing a block copolymer composition as described in any one of [12] to [17], in which the vinyl monomer (B) is at least one monomer selected from the group consisting of a styrene-based monomer, a methacrylate-based monomer, and an acrylate-based monomer.

Advantageous Effects of Invention

According to the present invention, a block copolymer composition which has an appropriate viscosity and good handleability and is suitable for a dispersant, a resin additive, or the like is obtained.

Furthermore, according to the present invention, a block copolymer composition in which a molecular structure or a molecular weight distribution can be sufficiently controlled and which contains a block copolymer having a specific molecular structure and having a molecular weight distribution within an appropriate range is obtained.

DESCRIPTION OF EMBODIMENTS

Explanation of Terms

"block copolymer" means a copolymer which has a plurality of blocks in a polymer and in which adjacent blocks have different configurations (chemical structures). For example, adjacent blocks are constituted by constitutional units derived from different monomers.

A "macromonomer" means a monomer which has a radical-reactive functional group (a radically polymerizable functional group or an addition-reactive functional group), and usually has a repeating structure and a relatively large molecular weight. The functional group is preferably present at a terminal.

A "vinyl monomer" means a compound containing at least one vinyl group (carbon-carbon unsaturated double bond).

"(Meth)acrylate" refers to "acrylate" or "methacrylate".

An "organic iodine compound" means a compound having a carbon-iodine bond in one molecule.

Block Copolymer Composition

A block copolymer composition according to a first aspect of the present invention is a block copolymer composition containing a block copolymer in which constitutional units of all blocks are derived from vinyl monomers, at least one block has a branched structure, and a main chain and a branched chain consist of the same constitutional unit. The block copolymer composition according to the first aspect of the present invention is preferably a block copolymer composition containing such a block copolymer as a main component, and more preferably a block copolymer composition substantially consisting of such a block copolymer.

A block copolymer composition according to a second aspect of the present invention is a block copolymer composition which contains a block copolymer in which constitutional units of all blocks are derived from vinyl monomers and at least one block has a branched structure, and in which a molecular weight distribution (Mw/Mn) is 1.5 to 3.4. The block copolymer composition according to the second aspect of the present invention is preferably a block copolymer composition containing such a block copolymer as a main component, and more preferably a block copolymer composition substantially consisting of such a block copolymer.

The block copolymer contained in the block copolymer composition of the present invention has a branched structure. The number of branched structures of the block copolymer, that is, the number of branched chains is preferably 1 or more and 8 or less and more preferably 2 or more and 7 or less per molecule on average. When the number of branched chains is equal to or more than the lower limit value, a viscosity is reduced and handleability is improved. When the number of branched chains is equal to or less than the upper limit value, a phase-separated structure of the block copolymer becomes clearer and a function such as dispersion provided by the block copolymer composition is easily exhibited, which is preferable.

In the present invention, a block having a branched structure in the block copolymer preferably has a main chain and a branched chain which consist of the same constitutional unit. Furthermore, "a main chain and a branched chain which consist of the same constitutional unit" means that a constitutional unit of the branched chain is the same as a constitutional unit of the main chain in a portion where the branching occurs.

Since the block copolymer has a branched structure, the viscosity is reduced, and since the main chain and the branched chain of the block consist of the same constitutional unit, properties of each constitutional unit are sufficiently exhibited as a block. Therefore, the block copolymer composition of the present invention is excellent in handleability and exhibits high functions as various additives such as a resin additive, a dispersant, a coating composition, and a lithography polymer.

The branched structure of the block copolymer contained in the block copolymer composition can be confirmed, for example, by the following method.

A degree of branching can be estimated by the following Mark-Houwink-Sakurada equation.

$$\eta = K \times M^a$$

($\eta$: intrinsic viscosity, M: absolute molecular weight, and K and a are constants)

K of a given polymer in the same solvent at the same temperature and concentration is unchanged, only an exponential term a reflects the degree of branching of the polymer, and a decrease in the value of a indicates an increase in branching. a which is an index of branching can be calculated, for example, from a slope of a logarithmic plot (Mark-Houwink-Sakurada plot) of the intrinsic viscosity and the absolute molecular weight measured using GPC-TDA. Since at least one block in the block copolymer contained in the block copolymer composition of the present invention has a branched structure, the value of a of the block copolymer is usually smaller than that of a linear polymer (a>0.7) having a typical flexible chain.

In addition, $^{13}C$-NMR measurement is performed, and when a quaternary carbon adjacent methine group is detected at 38 to 41 ppm, it can be determined that the block copolymer has a branched structure. Moreover, the average number of branched chains per molecule of the block copolymer in the block copolymer composition can be determined from the peak intensity.

Whether the main chain and the branched chain consist of the same constitutional unit can be confirmed by tracking composition change during a polymerization process by $^1H$-NMR in addition to the above measurement results.

In the block copolymer composition of the present invention, constitutional units of all blocks are substantially derived from vinyl monomers. However, the block may have a constitutional unit other than the constitutional unit derived from the vinyl monomer as long as the effects of the present invention are not significantly affected.

Examples of the vinyl monomer include monomers exemplified as a vinyl monomer (B) described later. Each block may consist of one kind of vinyl monomer, or may consist of two or more kinds of vinyl monomers. In the block copolymer of the present invention, a constitutional unit of at least one block is preferably derived from a methacrylate-based monomer or an acrylate-based monomer.

The block copolymer of the present invention preferably has an iodine atom at a terminal of the main chain. A functional group can be introduced at the terminal of the main chain having an iodine atom by substituting the iodine atom at the terminal with a nucleophilic reagent. Moreover, if necessary, the iodine atom at the terminal can be removed by a treatment at a high temperature.

Examples of the functional group which can be introduced by substitution with the nucleophilic reagent include an alkyl group, an amino group, an amide group, and a carboxyl group. For example, a block copolymer having a polar group such as an amino group and a carboxyl group at the terminal of the main chain exhibits particularly excellent performance as a dispersant due to interaction such as adsorption to a dispersoid. Furthermore, in this case, an alkylene structure (—$(CH_2)_n$—) may be included between an amino group or a carboxyl group at the terminal and the main chain of the polymer.

In the block copolymer composition of the present invention, a value of the molecular weight distribution (Mw/Mn) (hereinafter, also simply referred to as "Mw/Mn") is preferably 1.5 or more, more preferably 1.6 or more, and still more preferably 1.7 or more. Moreover, the value of Mw/Mn is preferably 3.4 or less, more preferably 3.2 or less, still more preferably 3.0 or less, and particularly preferably 2.8 or less. Mw/Mn of the block copolymer composition of the present invention is preferably 1.5 to 3.4. When Mw/Mn is equal to or less than the upper limit value of the above range, a phase structure of the block copolymer composition can be easily controlled to a high degree. Moreover, when Mw/Mn is equal to or more than the lower limit value of the above range, a melt viscosity and a solution viscosity of the block copolymer composition are reduced and the handleability is improved.

Regarding a number-average molecular weight (hereinafter, also referred to as "Mn") of the block copolymer composition of the present invention, the lower limit is preferably 3,000 or more, more preferably 5,000 or more, and still more preferably 10,000 or more, and the upper limit is preferably 1,000,000 or less, more preferably 500,000 or less, and still more preferably 200,000 or less. Mn of the block copolymer composition of the present invention is preferably 3,000 to 1,000,000. When Mn of the block copolymer composition is equal to or more than the lower limit value of the above range, mechanical strength of a molded article or a coating film containing the block copolymer composition tends to be favorable. When Mn of the block copolymer composition is equal to or less than the upper limit value of the above range, a solubility, a melt viscosity, and a solution viscosity suitable for obtaining a molded article or a coating film can be obtained.

The above-mentioned Mn and Mw/Mn are values calculated from a calibration curve of polymethyl methacrylate (PMMA) using gel permeation chromatography (GPC).

The block copolymer composition of the present invention forms a phase structure, exhibits the favorable solubility and melt viscosity while having a function such as high dispersibility of the block copolymer, and is preferably used as a dispersant, a resin additive, or the like. The dispersant or the resin additive is usually handled in a solution state or a mixed state with another resin material, but preferably has a low viscosity in consideration of handleability. For polymers having the same molecular weight, as the molecular weight distribution is narrower, the viscosity is higher, and as the molecular weight distribution is wider, the viscosity is lower. However, the function as a dispersant or a resin additive tends to be superior as the molecular weight distribution is narrower. Furthermore, even when the molecular weights are the same, the viscosity is reduced because the polymer has a branched structure.

Since the handleability such as a viscosity is improved while exhibiting excellent functions as a dispersant or a resin additive, the block copolymer composition preferably contains a block copolymer having a molecular weight distribution in the above-mentioned range and having the above-mentioned branched structure.

Method for Producing Block Copolymer Composition

A method for producing a block copolymer composition of the present invention is not particularly limited, but preferred production methods will be described below.

Examples of a method for producing a block copolymer composition according to the first aspect of the present invention include a method for obtaining a block copolymer composition by polymerizing a polymerizable composition containing a macromonomer (A), a vinyl monomer (B), and an organic iodine compound (C).

Macromonomer (A)

The macromonomer (A) is represented by Formula (I).

In Formula (1), ". . ." indicates a state where monomer units are polymerized. The macromonomer (A) has a group having a radical-reactive unsaturated double bond at one terminal of a poly(meth)acrylate segment.

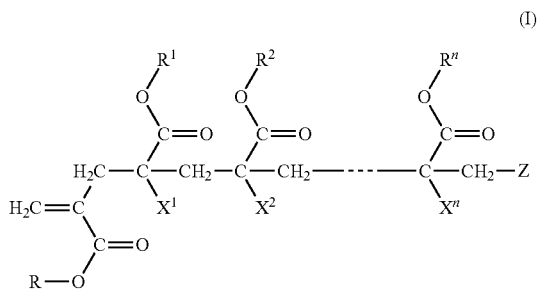

(I)

In Formula (1), R and $R^1$ to $R^n$ are each independently a hydrogen atom, an alkyl group, a cycloalkyl group, an aryl group, or a heterocyclic group. Z is a hydrogen atom or a group derived from a radical polymerization initiator. $X^1$ to $X^n$ are each independently a hydrogen atom or a methyl group. n is an integer of 2 to 10,000.

The alkyl group, the cycloalkyl group, the aryl group, and the heterocyclic group represented by R and $R^1$ to $R^n$ may have a substituent.

R and $R^1$ to $R^n$ are each preferably at least one group selected from an alkyl group and a cycloalkyl group, and more preferably an alkyl group.

Examples of the alkyl group represented by R and $R^1$ to $R^n$ include a branched or linear alkyl group having 1 to 20 carbon atoms. Specific examples thereof include a methyl group, an ethyl group, an n-propyl group, an i-propyl group, an n-butyl group, a t-butyl group, an i-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group. As the alkyl group, from the viewpoint of easiness of polymerization control, a methyl group, an ethyl group, an n-propyl group, an i-propyl group, an n-butyl group, a t-butyl group, a pentyl group, a hexyl group, a heptyl group, and an octyl group are preferable, a methyl group, an ethyl group, an n-propyl group, an i-propyl group, an n-butyl group, and a t-butyl group are more preferable, and a methyl group is particularly preferable.

Examples of the cycloalkyl group represented by R and $R^1$ to $R^n$ include a cycloalkyl group having 3 to 20 carbon atoms. Specific examples thereof include a cyclopropyl group, a cyclobutyl group, a cyclopentyl group, a cyclohexyl group, a cycloheptyl group, a cyclooctyl group, and an adamantyl group. As the cycloalkyl group, from the viewpoint of easiness of polymerization control, a cyclopropyl group, a cyclobutyl group, and an adamantyl group are preferable.

Examples of the aryl group represented by R and $R^1$ to $R^n$ include an aryl group having 6 to 18 carbon atoms. Specific examples of the aryl group having 6 to 18 carbon atoms include a phenyl group, a benzyl group, and a naphthyl group.

Examples of the heterocyclic group represented by R and $R^1$ to $R^n$ include a heterocyclic group having 5 to 18 carbon atoms. Examples of a hetero atom contained in the heterocyclic group include an oxygen atom, a nitrogen atom, and a sulfur atom. Specific examples of the heterocyclic group include a γ-lactone group, an ε-caprolactone group, and a morpholine group.

The substituents for R and $R^1$ to $R^n$ are each independently an alkyl group, an aryl group, a carboxy group, an alkoxycarbonyl group (—COOR'), a carbamoyl group (—CONR'R"), a cyano group, a hydroxy group, an amino group, an amide group (—NR'R"), a halogen atom, an allyl group, an epoxy group, an alkoxy group (—OR'), and a group exhibiting hydrophilicity or ionicity. Furthermore, R' and R" are each independently the same group as R (provided that a heterocyclic group is excluded).

Examples of the alkoxycarbonyl group as the substituent for R and $R^1$ to $R^n$ include a methoxycarbonyl group.

Examples of the carbamoyl group as the substituent for R and $R^1$ to $R^n$ include an N-methylcarbamoyl group and an N,N-dimethylcarbamoyl group.

Examples of the halogen atom as the substituent for R and $R^1$ to $R^n$ include a fluorine atom, a chlorine atom, a bromine atom, and an iodine atom.

Examples of the alkoxy group as the substituent for R and $R^1$ to $R^n$ include an alkoxy group having 1 to 12 carbon atoms, and specific examples thereof include a methoxy group.

Examples of the group exhibiting hydrophilicity or ionicity as the substituent for R and R' to $R^n$ include an alkali salt of a carboxy group or an alkali salt of a sulfoxyl group, a poly(alkylene oxide) group such as a polyethylene oxide group and a polypropylene oxide group, and a cationic substituent such as a quaternary ammonium base.

$X^1$ to $X^n$ are each independently a hydrogen atom or a methyl group, and a methyl group is preferable.

In the macromonomer (A), from the viewpoint of ease of synthesis, at least half of $X^1$ to $X^n$ are preferably methyl groups.

Z is a hydrogen atom or a group (fragment) derived from a radical polymerization initiator, and examples thereof include the same group as a terminal group of a polymer obtained by known radical polymerization. When the radical polymerization initiator is not used during the production, Z is a hydrogen atom.

n means the number of monomer units in one molecule of the macromonomer (A). n is an integer of 2 to 10,000, preferably an integer of 10 to 1,000, and more preferably an integer of 30 to 500.

Mn of the macromonomer (A) is preferably 1,000 to 1,000,000. When Mn of the macromonomer (A) is equal to or more than the lower limit value of the above range, physical properties of the block copolymer, particularly mechanical physical properties tend to be favorable. Mn of the macromonomer (A) is more preferably 3,000 or more and still more preferably 5,000 or more. Moreover, Mn of the macromonomer (A) is more preferably 500,000 or less, still more preferably 300,000 or less, and particularly preferably 100,000 or less.

Mw/Mn of the macromonomer (A) is preferably 1.0 to 5.0 and more preferably 1.5 to 3.0.

Mn and Mw/Mn of the macromonomer (A) are values calculated from a calibration curve of polymethyl methacrylate (PMMA) using gel permeation chromatography (GPC).

The macromonomer (A) of the present invention contains a vinyl monomer unit as a constitutional unit, but the vinyl monomer for obtaining the macromonomer (A) can be selected independently of the vinyl monomer (B) as a copolymer component described later.

Examples of the vinyl monomer for obtaining the macromonomer (A) include methyl (meth)acrylate, ethyl (meth) acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, octyl (meth)acrylate, lauryl (meth)acrylate, dodecyl (meth)acrylate, stearyl (meth)acrylate, phenyl (meth)acrylate, benzyl (meth)acrylate, glycidyl (meth)acrylate, 2-ethylhexyl (meth)acrylate, 2-hydroxyethyl (meth)acrylate, 2-hydroxypropyl (meth)acrylate, 2-hydroxybutyl (meth) acrylate, 3-hydroxybutyl (meth)acrylate, 4-hydroxybutyl (meth)acrylate, polyethylene glycol (meth)acrylate, polypropylene glycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth) acrylate, phenoxyethyl (meth)acrylate, nonylphenoxyethyl (meth)acrylate, and 3-methoxybutyl (meth)acrylate.

Examples of commercially available products of these vinyl monomers include PLACCEL FM (trade name, caprolactone-added monomer of (meth)acrylate, manufactured by Daicel Chemical Industries, Ltd.), BLEMMER PME-100 (trade name, methoxypolyethylene glycol methacrylate (having two ethylene glycol chains), manufactured by NOF CORPORATION), BLEMMER PME-200 (trade name, methoxypolyethylene glycol methacrylate (having four ethylene glycol chains), manufactured by NOF CORPORATION), BLEMMER PME-400 (trade name, methoxypolyethylene glycol methacrylate (having nine ethylene glycol chains), manufactured by NOF CORPORATION), BLEMMER 50POEP-800B (trade name, octoxy polyethylene glycol-polypropylene glycol-methacrylate (having eight ethylene glycol chains and six propylene glycol chains), manufactured by NOF CORPORATION), BLEMMER 20ANEP-600 (trade name, nonylphenoxy (ethylene glycol-polypropylene glycol) monoacrylate, manufactured by NOF CORPORATION), BLEMMER AME-100 (trade name, manufactured by NOF CORPORATION), BLEMMER AME-200 (trade name, manufactured by NOF CORPORATION), and BLEMMER 50AOEP-800B (trade name, manufactured by NOF CORPORATION).

Among these examples, from the viewpoint of ease of polymerization control, methacrylate is preferable.

As the methacrylate, from the viewpoint of transparency of a molded article or a coating film, methyl methacryl ate, n-butyl methacryl ate, lauryl methacryl ate, dodecyl methacrylate, stearyl methacrylate, 2-ethylhexyl methacrylate, glycidyl methacrylate, 2-hydroxyethyl methacrylate, and 4-hydroxybutyl methacrylate are preferable, methyl methacrylate, n-butyl methacrylate, and 2-ethylhexyl methacrylate are more preferable, and methyl methacrylate is particularly preferable.

In addition, among these examples, from the viewpoint that a copolymer having excellent retention deterioration resistance is obtained, it is preferable to include acrylate in addition to methacrylate.

As the acrylate, methyl acrylate, ethyl acrylate, n-propyl acrylate, isopropyl acrylate, n-butyl acrylate, isobutyl acrylate, and t-butyl acrylate are preferable, and from the viewpoint of availability, methyl acrylate is preferable.

The vinyl monomer for obtaining the macromonomer (A) may include a vinyl monomer other than methacrylate and acrylate.

As the other vinyl monomer, an unsaturated carboxylic acid is preferable. Examples of the unsaturated carboxylic acid include acrylic acid, methacrylic acid, maleic acid, and maleic anhydride.

One of the vinyl monomers for obtaining the macromonomer (A) may be used alone, or two or more kinds thereof may be used in combination.

From the viewpoint of retention deterioration resistance of the copolymer, the amount of the methacrylate in the total of the vinyl monomers for obtaining the macromonomer (A) is preferably 80% to 99.5% by mass, preferably 82% to 99% by mass, still more preferably 84% to 99% by mass, and particularly preferably 85% to 99% by mass with respect to the total mass of the vinyl monomers.

The amount of the acrylate in the total of the vinyl monomers for obtaining the macromonomer (A) is preferably 0.1% to 20% by mass and more preferably 1% to 15% by mass with respect to the total mass of the vinyl monomers.

One of the macromonomers (A) may be used alone, or two or more kinds thereof may be used in combination.

Examples of a method for producing the macromonomer (A) include a production method using a cobalt chain transfer agent (the specification of U.S. Pat. No. 4,680,352), a method using an α-substituted unsaturated compound such as α-bromomethylstyrene as a chain transfer agent (PCT International Publication No. WO88/04304), a method for chemically bonding a polymerizable group (Japanese Unexamined Patent Application, First Publication No. S60-133007 and the specification of U.S. Pat. No. 5,147,952), and a method using thermal decomposition (Japanese Unexamined Patent Application, First Publication No. H11-240854).

As the method for producing the macromonomer (A), a production method using a cobalt chain transfer agent is preferable from the viewpoint that the number of production steps is small and a catalyst having a high chain transfer constant is used. By using a cobalt chain transfer agent having a high chain transfer constant, with a small amount thereof, a macromonomer (A) whose molecular weight is controlled is obtained.

Examples of the method for producing the macromonomer (A) using a cobalt chain transfer agent include aqueous dispersion polymerization methods such as a bulk polymerization method, a solution polymerization method, a suspension polymerization method, and an emulsion polymerization method. Among them, from the viewpoint of simplification of a recovery step of the macromonomer (A), aqueous dispersion polymerization methods such as a suspension polymerization method and an emulsion polymerization method are preferable and suspension polymerization is particularly preferable.

As the cobalt chain transfer agent, a cobalt chain transfer agent described in the specification of U.S. Pat. No. 4,680,352 can be used. As the cobalt chain transfer agent, a monovalent cobalt complex obtained by reacting cobalt(II) acetate, diphenylglyoxime, and a boron trifluoride-diethyl ether complex may be used.

A used amount of the cobalt chain transfer agent is preferably 0.1 to 50 ppm and more preferably 1 to 25 ppm with respect to the total amount of the vinyl monomers used for producing the macromonomer (A).

Examples of a solvent used when the macromonomer (A) is obtained by the solution polymerization method include a hydrocarbon-based solvent such as toluene; an ether-based solvent such as diethyl ether and tetrahydrofuran; a halogenated hydrocarbon-based solvent such as dichloromethane and chlorofoim; a ketone-based solvent such as acetone; an alcohol-based solvent such as methanol; a nitrile-based solvent such as acetonitrile; a vinyl ester-based solvent such as ethyl acetate; a carbonate-based solvent such as ethylene carbonate; and supercritical carbon dioxide. One of the solvents may be used alone, or two or more kinds thereof may be used in combination.

Specific examples of the method for producing the macromonomer (A) include the following methods.

A raw material composition containing a dispersant, a water-soluble salt, a vinyl monomer, a cobalt chain transfer agent, and a polymerization initiator is prepared. The raw material composition is subjected to suspension polymerization at 70° C. to 100° C. for 2 to 7 hours to prepare an aqueous suspension containing the macromonomer (A). The macromonomer (A) is recovered by filtration from the obtained aqueous suspension.

The macromonomer (A) is preferably obtained by subjecting the vinyl monomer to suspension polymerization using the cobalt chain transfer agent. In the production of the copolymer, a powdery substance obtained by recovering and purifying the macromonomer (A) produced by the above-mentioned method may be used, and an aqueous suspension containing the macromonomer (A), which is synthesized by suspension polymerization, may be used as it is.

A commercially available product may be used as the macromonomer (A). Examples of the commercially available product of the macromonomer (A) include ELVACITE (registered trademark) series (manufactured by Lucite International).

Vinyl Monomer (B)

Examples of the vinyl monomer (B) include the same vinyl monomers as those exemplified as the vinyl monomer for obtaining the macromonomer (A).

One of the vinyl monomers (B) may be used alone, or two or more kinds thereof may be used in combination.

As the vinyl monomer (B), from the viewpoint of polymerization control, at least one monomer selected from the group consisting of a styrene-based monomer, a methacrylate-based monomer, and an acrylate-based monomer is preferable.

Examples of the styrene-based monomer include styrene, α-methylstyrene, o-, m-, or p-methylstyrene, o-, m-, or p-methoxystyrene, o-, m-, or p-t-butoxystyrene, o-, m-, or p-chloromethylstyrene, o-, m-, or p-chlorostyrene, o-, m-, or p-hydroxystyrene, o-, m-, or p-styrenesulfonic acid and derivatives thereof, sodium o-, m-, or p-styrenesulfonate, and o-, m-, or p-styreneboronic acid and derivatives thereof. Among them, from the viewpoint of polymerization control, styrene is preferable.

As the methacrylate-based monomer and the acrylate-based monomer, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, octyl (meth)acrylate, lauryl (meth)acrylate, dodecyl (meth)acrylate, stearyl (meth)acrylate, phenyl (meth)acrylate, benzyl (meth)acrylate, glycidyl (meth)acrylate, 2-ethylhexyl (meth)acrylate, 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth) acrylate, polyethylene glycol (meth)acrylate, polypropylene glycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)

acrylate, phenoxyethyl (meth)acrylate, nonylphenoxyethyl (meth)acrylate, and 3-methoxybutyl (meth)acrylate are preferable, and methyl acrylate, ethyl acrylate, n-butyl acrylate, lauryl acrylate, dodecyl acrylate, stearyl acrylate, 2-ethylhexyl acrylate, glycidyl acrylate, 2-hydroxyethyl acrylate, 4-hydroxybutyl acrylate, and methoxyethyl acrylate are more preferable.

Organic Iodine Compound (C)

In the method for producing a block copolymer composition according to the first aspect of the present invention, an organic iodine compound (C) (dormant species) having a carbon-iodine bond is added, and iodine provided to a growing chain from the organic iodine compound (C) is used as a protective group. The organic iodine compound (C) is not particularly limited as long as the compound has at least one carbon-iodine bond in a molecule and acts as a dormant species. As the organic iodine compound (C), a compound containing one or two iodine atoms in one molecule is preferable.

The organic iodine compound (C) may be added to a polymerizable composition as the organic iodine compound (C), or a compound added as another compound may react in the polymerizable composition to form the organic iodine compound (C).

Examples of the organic iodine compound (C) include iodotrichloromethane, dichlorodiiodomethane, iodotribromomethane, dibromodiiodomethane, bromotriiodomethane, iodoform, diiodomethane, methyl iodide, triiodoethane, ethyl iodide, diiodopropane, isopropyl iodide, t-butyl iodide, iododichloroethane, chlorodiiodoethane, diiodopropane, chloroiodopropane, iododibromoethane, bromoiodopropane, 2-iodo-2-polyethyleneglycosylpropane, 2-iodo-2-amidinopropane, 2-iodo-2-cyanobutane, 2-iodo-2-cyano-4-methylpentane, 2-iodo-2-cyano-4-methyl-4-methoxypentane, 4-iodo-4-cyanopentanoic acid, methyl-2-iodoisobutyrate, 2-iodo-2-methylpropanamide, 2-iodo-2,4-dimethylpentane, 2-iodo-2-cyanobutanol, 2-iodo-2-methyl-N-(2-hydroxyethyl) propionamido-4-methylpentane, 2-iodo-2-methyl-N-(1,1-bis(hydroxymethyl)-2-hydroxyethyl) propionamido-4-methylpentane, 2-iodo-2-(2-imidazolin-2-yl) propane, 2-iodo-2-(2-(5-methyl-2-imidazolin-2-yl) propane, iodobenzyl cyanide (PhCN-I), ethyl-2-iodophenyl acetate (PhE-I), diethyl-2-iodo-2-methylmalonate (EEMA-I), 2-iodo-2-cyanopropane (CP-I), 1-iodo-1-cyanoethane (CE-I), 1-iodo-1-phenyl ethane (PE-I), ethyl-2-iodoisobutyrate (EMA-I), ethyl-2-iodovalerate (EPA-I), ethyl-2-iodopropionate (EA-I), ethyl-2-iodoacetate (E-I), 2-iodoisobutyric acid (MAA-I), hydroxyethyl-2-iodoisobutyrate (HEMA-I), 2-iodopropionic acid amide (AAm-I), ethylene glycol bis(2-iodoisobutyrate) (EMA-II), diethyl-2,5-diiodoadipate (EA-II), glycerol-tris(2-iodoisobutyrate) (EMA-III), and 6-(2-iodo-2-isobutyroxy) hexyltriethoxysilane (IHE).

One of the organic iodine compounds (C) may be used alone, or two or more kinds thereof may be used in combination.

Among the organic iodine compounds (C), from the viewpoint of polymerization control, at least one compound selected from the group consisting of PhCN-I, PhE-I, EEMA-I, CP-I, CE-I, PE-I, EMA-I, EPA-I, EA-I, E-I, MAA-I, HEMA-I, AAm-I, EMA-II, EA-II, EMA-III, and IHE is preferable.

In the present production method, it is preferable that the polymerizable composition described later further contains a catalyst (D) or an azo-based radical polymerization initiator (E) since a polymerization rate or a monomer conversion rate is easily improved.

As a preferred production method, a method for obtaining a block copolymer composition by polymerizing a polymerizable composition containing the macromonomer (A), the vinyl monomer (B), the organic iodine compound (C), and the catalyst (D) is exemplified.

As the macromonomer (A), the vinyl monomer (B), and the organic iodine compound (C), the same components as those described above can be used.

Catalyst (D)

The catalyst (D) is used for extracting an iodine atom in a carbon atom-iodine atom bond. By adding the catalyst (D), a uniform dissociation reaction of iodine atoms from the carbon atom-iodine atom bond is promoted, and the polymerization rate can be increased. Furthermore, as the catalyst (D), not only the catalyst itself, but also a precursor which, when added to the polymerizable composition, forms a catalyst during a polymerization reaction is included.

As the catalyst (D), at least one catalyst selected from the group consisting of the following catalysts (D1) to (D6) is preferable.

Catalyst (D1): a non-metal compound containing a halide ion and a non-metal atom which is in a cationic state and forms an ionic bond with the halide ion Catalyst (D2): a compound (hereinafter, also referred to as a "compound (D21)") containing a carbon atom and at least one halogen atom directly bonded to the carbon atom, or a hydrocarbon compound serving as a precursor of the compound (D21)

Catalyst (D3): an organic compound having a nitrogen atom, a phosphorus atom, a sulfur atom, or an oxygen atom and having redox properties Catalyst (D4): a compound selected from the group consisting of ethylene, acetylene, oligoacetylene, polyacetylene, fullerene, carbon nanotube, and derivatives thereof Catalyst (D5): an alkali metal halide compound or an alkaline earth metal halide compound Catalyst (D6): a compound selected from the group consisting of a phosphorus compound, a nitrogen-containing compound, and an oxygen-containing compound other than the catalysts (D1) to (D5)

Examples of the catalyst (D1) include the following compounds.

Examples of a non-metal compound having a nitrogen atom as a non-metal atom include an imidazole salt compound, a pyridine salt compound, a quaternary amine salt compound, and derivatives thereof.

Examples of the imidazole salt compound include 1-methyl-3-methyl-imidazolium iodide (EMIZI) and 1-ethyl-3-methylimidazolium bromide (EMIZBr).

Examples of the pyridine salt compound include 2-chloro-1-methylpyridinium iodide (CMPI).

Examples of the quaternary amine salt compound include tetra-n-butylammonium iodide (BNI), tetra-n-butylammonium triiodide ($BNI_3$), and tetra-n-butylammonium bromodiiodide (BNBrI2).

Examples of a non-metal compound having a phosphorus atom as a non-metal atom include a phosphonium salt compound such as methyltributylphosphonium iodide (BMPI), tetraphenylphosphonium iodide (PPI), and derivatives thereof.

Examples of a non-metal compound having a sulfur atom as a non-metal atom include tributylsulfonium iodide (BSI) and derivatives thereof.

Examples of a non-metal compound having an iodine atom as a non-metal atom include diphenyliodonium iodide (PII).

Examples of a non-metal compound having two kinds of non-metal atoms include hexaphenyldiphosphazenium chloride (PPNCl) and derivatives thereof.

Examples of the catalyst (D2) include the following compounds.

Examples of the compound (D21) include halocarbon (such as $CI_4$), alkyl halide (such as $(CH_3)_3CI$, $(CH_3)_2CI_2$, and $CH_3CI_3$), aryl halide (such as diphenylmethane iodide), and heteroaryl halide.

Examples of the hydrocarbon compound serving as a precursor of the compound (D21) include a compound in which a halogen atom bonded to a carbon atom in the compound (D21) is substituted with a hydrogen atom.

For example, a compound in which one or two hydrogen atoms and two or three substituents for radical stabilization are bonded to the carbon atom is preferable. As the substituent for radical stabilization, a substituent which forms a resonance structure together with a carbon atom of a central element is preferable. One substituent other than the hydrogen atom and the substituent for radical stabilization may be bonded to the carbon atom of the central element, but it is preferable that no other substituents are bonded to the carbon atom of the central element.

Examples of the catalyst (D3) include an organic compound having a nitrogen atom, a phosphorus atom, a sulfur atom, or an oxygen atom and having redox properties.

Examples of an organic compound having a nitrogen atom include trialkylamine (such as triethylamine and tributylamine), tetrakisdimethylaniinoethene (TDAE), and 1,4,8,11-tetramethyl-1,4,8,11-tetraazacyclotetradecan-etributylphosphine (TDME). An organic compound having a hole transporting ability may be used. Moreover, phthalic acid imides, pyridines, bipyridines, N,N,N',N'',N'''-pentamethyldiethylenetriamine (PMDETA), ethylenediamine, dimethylethylenediamine, tetramethylethylenediamine, tetramethyldiaminomethane, tris(2-aminoethyl) amine, tris(2-(methylamino) ethyl) amine, hematoporphyrin, and derivatives thereof may be used.

Examples of an organic compound having a phosphorus atom include trialkylphosphine (such as triethylphosphine), triarylphosphine (such as triphenylphosphine), phosphonic acid, 1,2-bis(diphenylphosphino) methane, and derivatives thereof.

Examples of an organic compound having a sulfur atom include thiophene, oligothiophene, polythiophene, tetrathiofulvalene (TTF), bis(ethylenedithio) tetrathiafulvalene (BTTF), 3,4-ethylenedioxythiophene (EDOT), poly(3,4-ethylenedioxythiophene) (PEDOT), and derivatives thereof.

Examples of an organic compound having an oxygen atom include furan, oligofuran, polyfuran, and derivatives thereof.

The catalyst (D4) is a compound having a carbon atom as a central element, such as ethylene, acetylene, oligoacetylene, polyacetylene, fullerene, and carbon nanotubes, and derivatives thereof.

Examples of an alkali metal atom of the alkali metal halide compound in the catalyst (D5) include lithium, sodium, potassium, rubidium, cesium, and francium. Examples of an alkaline earth metal atom of the alkaline earth metal halide compound include beryllium, magnesium, calcium, strontium, barium, and radium. Among them, sodium, potassium, cesium, magnesium, and calcium are preferable, and sodium and potassium are particularly preferable.

Examples of a halogen atom contained in the alkali metal halide compound and the alkaline earth metal halide compound include a fluorine atom, a chlorine atom, a bromine atom, and an iodine atom. Among them, from the viewpoint that a molecular weight distribution is easily narrowed, a bromine atom or an iodine atom is preferable and an iodine atom is particularly preferable.

Examples of the alkali metal halide compound include sodium iodide, potassium iodide, and cesium iodide.

Examples of the alkaline earth metal halide compound include magnesium iodide and calcium iodide.

Examples of the catalyst (D6) include the following compounds.

Examples of the phosphorus compound include phosphorous acid ester and a phosphinate-based compound.

Examples of the phosphorous acid ester include dimethyl phosphite, diethyl phosphite, dibutyl phosphite, diphenyl phosphite, dibenzyl phosphite, bis(2-ethylhexyl) phosphite, bis(2,2,2-trifluoroethyl) phosphite, diallyl phosphite, and ethylene phosphite.

Examples of the phosphinate-based compound include diperfluoroethyl phosphinate, ethoxyphenyl phosphinate, phenylphenoxy phosphinate, ethoxymethyl phosphinate, and phenoxymethyl phosphinate.

As the phosphorus compound, from the viewpoint of availability and a solubility, dimethyl phosphite, diethyl phosphite, dibutyl phosphite, and diphenyl phosphite are preferable. One of these phosphorus compounds may be used alone, or two or more kinds thereof may be used in combination.

Examples of the nitrogen-containing compound include an imide-based compound. Examples of the imide-based compound include succinimide, 2,2-dimethylsuccinimide, α,α-dimethyl-β-methylsuccinimide, 3-ethyl-3-methyl-2,5-pyrrolidinedione, cis-1,2,3,6-tetrahydrophthalimide, α-methyl-α-propylsuccinimide, 5-methylhexahydroisoindole-1,3-dione, 2-phenylsuccinimide, α-methyl-α-phenylsuccinimide, 2,3-diacetoxysuccinimide, maleimide, phthalimide, 4-methylphthalimide, N-chlorophthalimide, N-bromophthalimide, 4-nitrophthalimide, 2,3-naphthalenecarboximide, pyromellitic diimide, 5-bromoisoindole-1,3-dione, N-chlorosuccinimide, N-bromosuccinimide, and N-iodosuccinimide (NIS).

As the nitrogen-containing compound, from the viewpoint of availability and a solubility, succinimide, phthalimide, N-chlorosuccinimide, N-bromosuccinimide, and NIS are preferable. One of these nitrogen-containing compounds may be used alone, or two or more kinds thereof may be used in combination.

Examples of the oxygen-containing compound include a phenolic compound having a phenolic hydroxyl group, an iodooxyphenyl compound which is an iodide of a phenolic hydroxyl group, and vitamins.

Examples of the phenolic compound include phenol, hydroquinone, methoxyhydroquinone, t-butylphenol, t-butylmethylphenol, catechol, resorcin, di-t-butylhydroxytoluene, dimethylphenol, trimethylphenol, di-t-butyl group-carrying polymer fine particles. These compounds can also be used as a polymerization inhibitor for storage.

Examples of the iodooxyphenyl compound include thymol iodide.

Examples of the vitamins include vitamin C and vitamin E.

As the oxygen-containing compound, from the viewpoint of availability and a solubility, phenol, catechol, vitamin C, and vitamin E are preferable. One of these oxygen-containing compounds may be used alone, or two or more kinds thereof may be used in combination.

In the present production method, the polymerizable reactant may further contain the azo-based radical polymerization initiator (E) described later.

As another preferred production method, a method for obtaining a block copolymer composition by polymerizing a polymerizable composition containing the macromonomer (A), the vinyl monomer (B), the organic iodine compound (C), and the azo-based radical polymerization initiator (E) are exemplary examples.

As the macromonomer (A), the vinyl monomer (B), and the organic iodine compound (C), the same components as those described above can be used.

Azo-Based Radical Polymerization Initiator (E)

The azo-based radical polymerization initiator (E) is used for increasing a concentration of a radical in the polymerizable composition to increase the polymerization rate, when the polymerizable composition containing the macromonomer (A), the vinyl monomer (B), and the organic iodine compound (C) is polymerized.

Examples of the azo-based radical polymerization initiator (E) include 2,2'-azobis(isobutyronitrile), 2,2'-azobis(2-methylbutyronitrile), 2,2'-azobis(2,4-dimethylvaleronitrile), 1,1'-azobis(cyclohexane-1-carbonitrile), and 2,2'-azobis(2,4-dimethyl-4-methoxyvaleronitril ).

One of the azo-based radical polymerization initiators (E) may be used alone, or two or more kinds thereof may be used in combination.

Among the azo-based radical polymerization initiators (E), 2,2'-azobis(isobutyronitrile) (10-hour half-life temperature of 65° C.), 2,2'-azobis(2-methylbutyronitrile) (10-hour half-life temperature of 67° C.), 2,2'-azobis(2,4-dimethylvaleronitrile) (10-hour half-life temperature of 51° C.), and 1,1'-azobis(cyclohexane-1-carbonitrile) (10-hour half-life temperature of 88° C.) are preferable. This is because these azo-based radical polymerization initiators have a 10-hour half-life temperature within an appropriate range and thus polymerization control is easily performed.

Examples of a method for producing a block copolymer composition according to the second aspect of the present invention include a method for obtaining a block copolymer composition by polymerizing a polymerizable composition containing the macromonomer (A), the vinyl monomer (B), the azo-based radical polymerization initiator (E), and iodine ($I_2$).

In the present production method, during a process of polymerizing the polymerizable composition, at least a part of each of the azo-based radical polymerization initiator (E) and the iodine reacts to form the organic iodine compound (C) in the polymerizable composition, and the organic iodine compound (C) functions as a dormant species.

As the macromonomer (A), the vinyl monomer (B), and the azo-based radical polymerization initiator (E), the same components as those described above can be used.

In the present production method, it is preferable that the polymerizable composition further contains the above-mentioned catalyst (D) since the polymerization rate or the monomer conversion rate is easily improved. As the catalyst (D), the same catalysts as those described above can be used.

Composition of Polymerizable Compositions

The composition of the polymerizable composition used in the method for producing a block copolymer composition described above will be described. Hereinafter, a "used amount" indicates an amount fed to the polymerizable composition.

Case where Polymerizable Composition Contains Macromonomer (A), Vinyl Monomer (B), and Organic Iodine Compound (C)

A used amount of the macromonomer (A) is optional, but is preferably more than 15% by mass and more preferably more than 30% by mass, in terms of a feeding ratio (mass ratio), with respect to the total amount of the macromonomer (A) and the vinyl monomer (B). Moreover, the used amount is preferably less than 85% by mass and more preferably less than 70% by mass. When the used amount of the macromonomer (A) is within the above range, various physical properties expected to be imparted to the block copolymer by using the macromonomer (A) are more easily reflected in the copolymer.

A used amount of the vinyl monomer (B) is optional, but is preferably more than 15% by mass and more preferably more than 30% by mass, in terms of a feeding ratio (mass ratio), with respect to the total amount of the macromonomer (A) and the vinyl monomer (B). Moreover, the used amount is preferably less than 85% by mass and more preferably less than 70% by mass. When the used amount of the vinyl monomer (B) is within the above range, various physical properties expected to be imparted to the copolymer by using the vinyl monomer (B) are more easily reflected in the copolymer.

A used amount of the organic iodine compound (C) is optional, but is preferably 0.001 to 0.5 mol and more preferably 0.002 to 0.1 mol per mole of the vinyl monomer (B). When the used amount of the organic iodine compound (C) is within the above range, the amount is sufficient to provide iodine as a protective group to a growing chain, and the polymerization rate is not extremely reduced.

Case where Polymerizable Composition Contains Macromonomer (A), Vinyl Monomer (B), Organic Iodine Compound (C), and Azo-Based Radical Polymerization Initiator (E)

A used amount of the azo-based radical polymerization initiator (E) is preferably more than 0.001 equivalent and more preferably more than 0.002 equivalent, in terms of a molar equivalent number, with respect to the organic iodine compound (C). Moreover, the used amount of the azo-based radical polymerization initiator (E) is preferably not more than 10 equivalent and more preferably not more than 5 equivalent, in terms of a molar equivalent number, with respect to the organic iodine compound (C). When the used amount of the azo-based radical polymerization initiator (E) is equal to or more than the lower limit value of the above range, an appropriate polymerization rate can be obtained. Furthermore, the used amount of the azo-based radical polymerization initiator (E) is equal to or less than the upper limit value of the above range, the amount of a homopolymer of the vinyl monomer (B) formed as a by-product in the block copolymer composition can be suppressed.

Case where Polymerizable Composition Contains Macromonomer (A), Vinyl Monomer (B), Azo-Based Radical Polymerization Initiator (E), and Iodine The used amount of the azo-based radical polymerization initiator (E) is optional, but is preferably 0.001 to 0.05 mol and more preferably 0.002 to 0.02 mol per mole of the vinyl monomer (B). When the used amount of the azo-based radical polymerization initiator (E) is within the above range, an appropriate polymerization rate can be obtained.

In addition, a used amount of the iodine preferably satisfies the following condition (i).

$$0<[Q]/[P]<0.60 \qquad (i)$$

Here, [Q] is a molar equivalent number of the iodine in the polymerizable composition, and [P] is a molar equivalent number of the azo-based radical polymerization initiator (E).

[Q]/[P] is preferably 0.01 or more and more preferably 0.1 or more. When [Q]/[P] is equal to or more than the lower limit value of the above range, a molecular weight and a molecular weight distribution are sufficiently controlled. When [Q]/[P] is less than 0.60, inhibition of polymerization due to a side reaction is easily suppressed. The initiator efficiency of the azo-based radical polymerization initiator (E) is generally about 0.6 to 0.7. Therefore, the used amount of the iodine most preferably satisfies $0.1 \leq [Q]/[P]<0.60$.

Even when the polymerizable composition described later contains the catalyst (D), [Q]/[P] is preferably within the above range, but when the polymerizable composition does not contain the catalyst (D), polymerization control is more required and thus [Q]/[P] is particularly preferably within the above range.

Case where Polymerizable Composition Contains at Least Macromonomer (A), Vinyl Monomer (B), and Catalyst (D)

Additionally, the polymerizable composition appropriately contains one or more kinds of components selected from the organic iodine compound (C), the azo-based radical polymerization initiator (E), and the iodine.

A used amount of the catalyst (D) is preferably 0.1 to 1000 mmol and more preferably 0.5 to 500 mmol with respect to 1 liter of a reaction solution. When the used amount of the catalyst (D) is within the above range, the polymerization rate is sufficiently promoted, and the molecular weight distribution can be narrowed.

Solvent

A solvent can be appropriately added to the polymerizable composition. Examples of the solvent include the same solvents as those provided as exemplary examples of the polymerization for obtaining the macromonomer (A).

When the solvent is used, a used amount of the solvent is preferably 30 parts by mass or more and 700 parts by mass or less with respect to 100 parts by mass of the vinyl monomer (B).

Other additives can be added to the polymerizable composition, if necessary. Examples of other additives include a chain transfer agent such as mercaptan.

Polymerization Conditions

The polymerization method in the method for producing a block copolymer composition of the present invention is not particularly limited, and examples thereof include a bulk polymerization method, a solution polymerization method, a suspension polymerization method, and an emulsion polymerization method.

The polymerization reaction may be performed in the presence of air, but from the viewpoint of efficiency of radical polymerization, is preferably performed under a condition in which the air is replaced with an inert gas such as nitrogen or argon.

A polymerization temperature is preferably 0° C. to 150° C. from the viewpoint of the polymerization rate and the like, and more preferably 20° C. to 120° C. from the viewpoint of polymerization control.

From the viewpoint that polymerization can easily proceed up to a region having a high monomer conversion rate, the polymerization temperature is preferably maintained constant until a conversion rate of the vinyl monomer (B) reaches 60%. The temperature condition after the monomer conversion rate is more than 60% is not limited to a certain value, and for example, the temperature can be further increased.

Furthermore, from the viewpoint of polymerization control, the polymerization temperature preferably satisfies the following condition (ii).

$$0<Tp-T_{10}<40 \qquad (ii)$$

Here, Tp is a polymerization temperature (° C.), and $T_{10}$ is a 10-hour half-life temperature (° C.) of the azo-based radical polymerization initiator (E). Moreover, the 10-hour half-life temperature is a value specific to the configuration of the radical polymerization initiator.

By setting $Tp-T_{10}$ within the above range, polymerization control is easily performed while maintaining the polymerization rate and increasing the monomer conversion rate. When the polymerizable composition does not contain the catalyst (D), polymerization control is more required, and thus $Tp-T_{10}$ is particularly preferably within the above range.

The polymerization time is not particularly limited, and, for example, can be set to 0.5 to 24 hours.

Polymerization Mechanism

The macromonomer (A) used in the present invention also functions as an addition cleavage-type chain transfer agent. For the reason, a macromonomer having a constitutional unit derived from the vinyl monomer (B) can also be formed in the polymerization process, and thus in the block copolymer contained in the block copolymer composition of the present invention, a block derived from the vinyl monomer (B) has a branched structure.

A specific polymerization mechanism will be described by taking, as an example, a case where a macromonomer having a constitutional unit derived from methyl methacrylate (MMA) is used as the macromonomer (A), n-butyl acrylate (BA) is used as the vinyl monomer (B), 2-iodo-2-cyanopropane (CP-I) is used as the organic iodine compound (C), and tetra-n-butylammonium iodide (BNI) is used as the catalyst (D). It is considered that the polymerization in the example proceeds as in the following (1) to (4).

(1) As shown in Formula (1), first, a carbon radical is formed from CP-I which is the organic iodine compound (C) by an action of BNI which is the catalyst (D). The formed carbon radical reacts with BA, which is the vinyl monomer (B), to become a growing radical having a constitutional unit derived from BA.

(2) As shown in Formula (2), the growing radical causes addition cleavage chain transfer when reacting with the macromonomer (A), and the macromonomer (B') having a constitutional unit derived from BA and a growing radical (A') derived from macromonomer (A) are formed in the system.

(3) As shown in Formula (3), the growing radical (A') is bonded to iodine to form a dormant species.

(4) As shown in Formula (4), the dormant species repeatedly forms a growing radical by the action of the catalyst (D). The block copolymer grows as the reaction between the growing radical and BA proceeds.

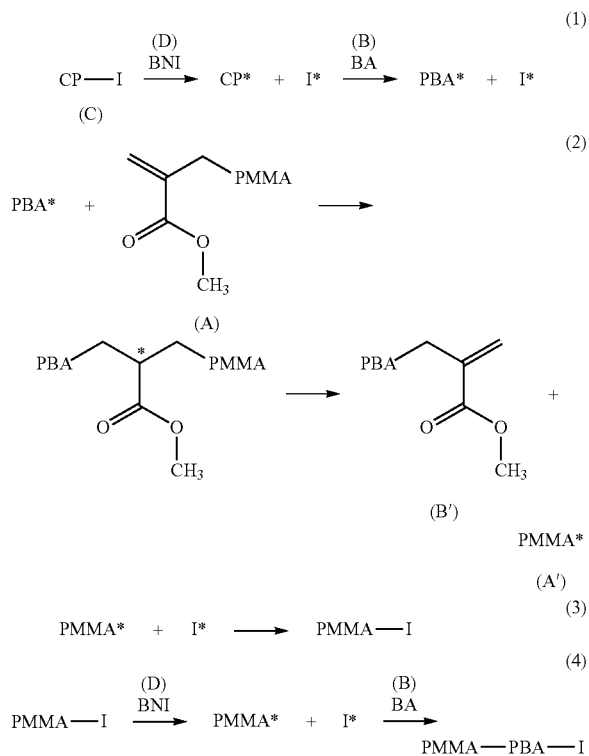

By the mechanism described above, the macromonomer (A) is consumed at an initial stage of polymerization, and a block copolymer in which a block derived from the macromonomer (A) is bonded to a block derived from BA, which is the vinyl monomer (B), is formed. In addition, a macromonomer (B') having a constitutional unit derived from BA is formed. Moreover, the polymerization proceeds in a controlled manner by the presence of terminal iodine.

The growing radical can also react with the macromonomer (B') having the constitutional unit derived from BA. As a result, a branched chain is introduced into the block derived from BA, and the macromonomer (B') having the constitutional unit derived from BA formed in the system is consumed.

The mechanism described above is the mechanism of the polymerization reaction of the polymerizable composition containing the macromonomer (A), the vinyl monomer (B), the organic iodine compound (C), and the catalyst (D), but it is considered that also in a plurality of other preferred production methods described above, the polymerization reaction proceeds by a similar reaction mechanism.

As a result of the polymerization reaction, finally, a block copolymer in which constitutional units of all blocks are derived from vinyl monomers, at least one block has a branched structure, and a main chain and a branched chain consist of the same constitutional unit is obtained.

The block copolymer produced by the above-mentioned production method has an iodine atom at the terminal of the main chain. The iodine atom at the terminal can be removed, if necessary, or a functional group derived from a nucleophilic reagent can be introduced by a treatment at a high temperature or substitution with the nucleophilic reagent.

Mw/Mn of the polymer obtained by typical controlled polymerization is generally less than 1.5. The polymerization mechanism of the polymerization reaction of the present invention also proceeds in a controlled polymerization mode, but since the branched structure is formed, Mw/Mn becomes larger than usual and becomes in the range of 1.5 to 3.4.

The application of the block copolymer composition of the present invention is not particularly limited, and examples thereof include a dispersant, a resin additive, a coating composition, and a lithography polymer.

Hereinafter, the present invention will be described specifically with reference to Examples, but the present invention is not limited by the following description. Moreover, "eq" indicates a "molar equivalent number". Furthermore, the amount of a solvent is represented by an amount of a solvent (% by mass) when the total amount including the solvent is 100% by mass.

Number-Average Molecular Weight (Mn) and Molecular Weight Distribution (Mw/Mn)

Regarding number-average molecular weights (Mn) and molecular weight distributions (Mw/Mn) of the macromonomer and the block copolymer composition, Mn and Mw/Mn were calculated from a calibration curve of PMMA using GPC ("HLC-8220" manufactured by TOSOH CORPORATION). Measurement conditions were as follows.

Column: TSK GUARD COLUMN SUPER HZ-L (4.6 mm×35 mm) and TSK-GEL SUPER HZM-N (6.0 mm×150 mm) connected in series,
Eluent: tetrahydrofuran,
Measurement temperature: 40° C., and
Flow rate: 0.6 mL/min Monomer Conversion Rate A monomer conversion rate (%) in each example was calculated as a proportion of an amount of a formed polymer to a sum of an amount of a residual monomer and the amount of the formed polymer, which are obtained from NMR ("BBF0400" manufactured by Bruker, 400 MHz) measurement.

Evaluation of Branched Structure

The branched structure of the block copolymer contained in the block copolymer composition was confirmed as follows.

An intrinsic viscosity η and an absolute molecular weight M of the copolymer were measured using GPC-TDA (manufactured by Viscotek Corporation), and a slope of a logarithmic plot (Mark-Houwink-Sakurada plot) thereof was determined as an exponential term a which is an index of branching. This value was compared with that of a linear polymer (a>0.7) having a typical flexible chain to determine the presence or absence of a branched structure.

Next, $^{13}$C-NMR measurement was performed, and when a quaternary carbon adjacent methine group was detected (at 38 to 41 ppm), it was determined that the copolymer has a branched structure, and the average number of branched chains per molecule of the block copolymer was determined from the peak intensity.

In the polymerization process of the present invention, in addition to the block copolymer formed by polymerization of the block derived from the macromonomer (A) and the vinyl monomer (B), the vinyl monomer (B) is polymerized, and the macromonomer (B') having the constitutional unit derived from the monomer coexists. By using this reaction mechanism, and tracking formation and consumption of the "macromonomer (B') containing the vinyl monomer (B) as a constitutional unit" by $^1$H-NMR, it is confirmed that the main chain and the branched chain of the block derived from the vinyl monomer (B) consist of the same constitutional unit.

That is, when the macromonomer (B') is consumed and incorporated into the block copolymer, the macromonomer (B') is incorporated as a branched chain into the main chain of the block containing the vinyl monomer (B) as a constitutional unit. Therefore, when the situation is detected, it can be confirmed that the vinyl monomer (B) which is the main chain of the block copolymer and the vinyl monomer (B) derived from the macromonomer (B') which is the branched chain have the same constitutional unit, and the main chain and the branched chain consist of the same constitutional unit.

Abbreviation

Abbreviations in the present Examples are as follows.

Macromonomer (A)

ELVACITE: PMMA-based macromonomer (ELVACITE 1010 manufactured by Lucite International, Mn=3,900)

Vinyl Monomer (B)

BA: n-Butyl acrylate (manufactured by Tokyo Chemical Industry Co., Ltd.)
St: Styrene (manufactured by Tokyo Chemical Industry Co., Ltd.)

Organic Iodine Compound (C)

CP-I: 2-Iodo-2-cyanopropane (manufactured by Tokyo Chemical Industry Co., Ltd.)

Azo-Based Radical Polymerization Initiator (E)

AIBN: 2,2'-Azobis(isobutyronitrile) (manufactured by Tokyo Chemical Industry Co., Ltd.)
V-40: 1,1'-Azobis(cyclohexane-1-carbonitrile) (manufactured by FUJIFILM Wako Pure Chemical Corporation)
V-65: 2,2'-Azobis(2,4-dimethylvaleronitrile) (manufactured by FUJIFILM Wako Pure Chemical Corporation)

Iodine

I$_2$: Iodine (manufactured by Tokyo Chemical Industry Co., Ltd.)

Catalyst (D)

BNI: Tetra-n-butylammonium iodide (manufactured by Tokyo Chemical Industry Co., Ltd.)
ONI: Tetra-n-octylammonium iodide (manufactured by Tokyo Chemical Industry Co., Ltd.)
DPM: diphenylmethane (manufactured by Tokyo Chemical Industry Co., Ltd.)
DEPh: diethyl phosphite (manufactured by Tokyo Chemical Industry Co., Ltd.)

Others (Non-Azo-Based Radical Polymerization Initiator)

BPO: Benzoyl peroxide (manufactured by Tokyo Chemical Industry Co., Ltd.)

10-Hour Half-Life Temperature $T_{10}$ 10-hour half-life temperatures of the azo-based radical polymerization initiators (E) (AIBN, V-40, and V-65) are shown in Table 1.

TABLE 1

| Azo-based radical polymerization initiator | 10-hour half-life temperature $T_{10}$ [° C.] |
|---|---|
| AIBN | 65 |
| V-40 | 88 |
| V-65 | 51 |

Example 1

A polymerizable composition containing the macromonomer (A), the vinyl monomer (B), the azo-based radical polymerization initiator (E), the iodine, and the catalyst (D) in composition shown in Table 2 was prepared. The polymerizable composition was transferred to a glass reaction vessel, a gas phase was replaced with an argon gas, and then a reaction was performed at a polymerization temperature of 110° C. for a polymerization time of 24 hours with stirring to obtain a block copolymer composition.

Furthermore, it is considered that the azo-based radical polymerization initiator (E) reacts with the iodine in a reaction system to form the organic iodine compound (C). The same applies to the following Examples.

Examples 2 to 9

Each block copolymer composition was obtained in the same manner as in Example 1 except that the composition of the polymerizable composition was changed to composition shown in Table 2.

Example 10

A block copolymer composition was obtained in the same manner as in Example 1 except that the composition of the polymerizable composition was changed to composition shown in Table 2, the polymerization temperature was changed to 80° C., and the polymerization time was changed to 6 hours.

Comparative Examples 1 and 2

Each block copolymer composition was obtained in the same manner as in Example 1 except that the composition of the polymerizable composition was changed to composition shown in Table 2.

Comparative Example 3

A block copolymer composition was obtained in the same manner as in Example 1 except that the composition of the polymerizable composition was changed to composition shown in Table 2, the polymerization temperature was changed to 80° C., and the polymerization time was changed to 4 hours.

Measurement results of the number-average molecular weight Mn, the molecular weight distribution Mw/Mn, and the monomer conversion rate of the block copolymer composition in each example are shown in Table 2. ">99" in the column of the monomer conversion rate in Table 2 means that a value is more than 99%.

TABLE 2

|  |  | Example 1 | Example 2 | Example 3 | Example 4 | Example 5 | Example 6 | Example 7 | Example 8 |
|---|---|---|---|---|---|---|---|---|---|
| Macromonomer (A) | ELVACITE | 40 | 40 | 40 | 40 | 40 | 40 | 40 | 40 |
| Vinyl monomer (B) | BA | 8000 | 8000 | 8000 | 8000 | 8000 | 8000 | 8000 | 8000 |
|  | St | — | — | — | — | — | — | — | — |
| Organic iodine compound (C) | CP-1 | — | — | — | — | — | — | — | 40 |
| Azo-based radical polymerization initiator (E) | AIBN | 30 | 27 | 27 | 28.8 | 30 | 30 | 30 | — |
| Peroxide-based radical polymerization initiator | BPO | — | — | — | — | — | — | — | — |
| Iodine ($I_2$) |  | 20 | 20 | 20 | 20 | 20 | 20 | 20 | — |
| [Q]/[P] |  | 0.67 | 0.74 | 0.74 | 0.69 | 0.67 | 0.67 | 0.67 | — |
| Catalyst (D) | (D1) ON1 | 320 | 320 | — | — | 40 | — | — | 320 |
|  | (D1) BNI | — | — | 320 | 320 | — | — | — | — |
|  | (D2) DPM | — | — | — | — | — | 320 | — | — |
|  | (D3) DEPh | — | — | — | — | — | — | 20 | — |
| Polymerization temperature Tp [° C.] |  | 110 | 110 | 110 | 110 | 110 | 110 | 110 | 110 |
| Polymerization time [hour] |  | 24 | 24 | 24 | 24 | 24 | 24 | 24 | 24 |
| Tp − $T_{10}$ [° C.] |  | 45 | 45 | 45 | 45 | 45 | 45 | 45 | 45 |
| Number-average molecular weight (Mn) |  | 23000 | 13000 | 12000 | 25000 | 12000 | 11000 | 9700 | 21000 |
| Molecular weight distribution (Mw/Mn) |  | 2.4 | 2.1 | 2.1 | 3.0 | 2.5 | 2.6 | 2.8 | 2.4 |
| Monomer conversion rate [%] |  | 84 | 71 | 56 | 82 | >99 | 59 | 76 | 77 |

|  |  | Example 9 | Example 10 | Comparative Example 1 | Comparative Example 2 | Comparative Example 3 |
|---|---|---|---|---|---|---|
| Macromonomer (A) | ELVACITE | 40 | 40 | 40 | 40 | 40 |
| Vinyl monomer (B) | BA | 8000 | — | 8000 | 8000 | — |
|  | St | — | 8000 | — | — | 8000 |
| Organic iodine compound (C) | CP-1 | 40 | — | — | — | — |
| Azo-based radical polymerization initiator (E) | AIBN | — | 80 | 10 | — | 80 |

TABLE 2-continued

| | | | | | | |
|---|---|---|---|---|---|---|
| Peroxide-based radical polymerization initiator | BPO | — | — | — | 40 | — |
| Iodine ($I_2$) | | — | 20 | — | 20 | — |
| [Q]/[P] | | — | 0.25 | 0 | — | 0 |
| Catalyst (D) | (D1) ON1 | — | — | — | 320 | — |
| | (D1) BNI | 320 | 80 | — | — | — |
| | (D2) DPM | — | — | — | — | — |
| | (D3) DEPh | — | — | — | — | — |
| Polymerization temperature Tp [° C.] | | 110 | 80 | 110 | 110 | 80 |
| Polymerization time [hour] | | 24 | 6 | 24 | 24 | 4 |
| Tp − $T_{10}$ [° C.] | | 45 | 15 | 45 | 45 | 15 |
| Number-average molecular weight (Mn) | | 23000 | 12000 | 27000 | 4500 | 32000 |
| Molecular weight distribution (Mw/Mn) | | 2.7 | 1.7 | 4.6 | 1.4 | 3.9 |
| Monomer conversion rate [%] | | 76 | 76 | >99 | 0 | >99 |

*All amounts are molar equivalent numbers (eq).

Example 11

A polymerizable composition was prepared by dissolving the macromonomer (A), the vinyl monomer (B), the azo-based radical polymerization initiator (E), and the iodine in composition shown in Table 3. The polymerizable composition was transferred to a glass reaction vessel, a gas phase was replaced with a nitrogen gas, and then a polymerization reaction was performed under conditions of a polymerization temperature and a polymerization time shown in Table 3 with stirring to obtain a block copolymer composition.

Furthermore, it is considered that the azo-based radical polymerization initiator (E) reacts with the iodine in a reaction system to form the organic iodine compound (C). The same applies to the following Examples.

Examples 12 to 29

Each block copolymer composition was obtained in the same manner as in Example 12 except that the composition of the polymerizable composition, the polymerization temperature, and the polymerization time were changed as shown in Tables 3 and 4.

Comparative Examples 4 to 6

Each block copolymer composition was obtained in the same manner as in Example 12 except that the composition of the polymerizable composition, the polymerization temperature, and the polymerization time were changed as shown in Table 4.

Measurement results of the number-average molecular weight Mn, the molecular weight distribution Mw/Mn, and the monomer conversion rate of the block copolymer composition in each example are shown in Tables 3 and 4. ">99" in the column of the monomer conversion rate in Table 4 means that a value is more than 99%.

TABLE 3

| | | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| Macromonomer (A) | ELVACITE | 40 | 40 | 40 | 40 | 40 | 40 | 40 | 40 | 40 | 40 | 40 |
| Vinyl monomer (B) | BA | 8000 | 8000 | 8000 | 8000 | 8000 | 8000 | 8000 | 8000 | 8000 | 8000 | 8000 |
| | St | — | — | — | — | — | — | — | — | — | — | — |
| Organic iodine compound (C) | CP-I | — | — | — | — | — | — | — | — | — | — | 40 |
| Azo-based radical polymerization initiator (E) | AIBN | 40 | 80 | 40 | 40 | 40 | 30 | — | — | 40 | 40 | 20 |
| | V-40 | — | — | — | — | — | — | 30 | — | — | — | — |
| | V-65 | — | — | — | — | — | — | — | 40 | — | — | — |
| Iodine ($I_2$) | | 20 | 20 | 20 | 20 | 20 | 20 | 20 | 20 | 20 | 20 | — |
| [Q]/[P] | | 0.5 | 0.25 | 0.5 | 0.5 | 0.5 | 0.67 | 0.67 | 0.5 | 0.5 | 0.5 | 0 |
| Solvent [% by mass] | Butyl acetate | — | — | — | — | — | — | — | — | 50 | — | — |
| | Toluene | — | — | — | — | — | — | — | 75 | — | 50 | — |
| Polymerization temperature Tp [° C.] | | 80 | 80 | 90 | 100 | 110 | 110 | 110 | 65 | 80 | 80 | 80 |
| Polymerization time [hour] | | 5 | 2 | 1.5 | 6 | 6 | 24 | 6 | 6 | 6 | 6 | 3 |
| Tp − $T_{10}$ [° C.] | | 15 | 15 | 25 | 35 | 45 | 45 | 22 | 14 | 15 | 15 | 15 |

TABLE 3-continued

|  | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|
| Number-average molecular weight (Mn) | 17300 | 8900 | 15000 | 11100 | 7700 | 3800 | 26800 | 7300 | 30400 | 28200 | 17600 |
| Molecular weight distribution (Mw/Mn) | 2.7 | 2.6 | 2.3 | 2.1 | 2.2 | 1.8 | 2.6 | 1.9 | 2.2 | 2.1 | 2.3 |
| Monomer conversion rate [%] | 83 | 88 | 78 | 65 | 65 | 12 | 96 | 71 | 90 | 93 | 91 |

*All amounts excluding the solvent are molar equivalent numbers (eq).

TABLE 4

|  |  | Example 22 | Example 23 | Example 24 | Example 25 | Example 26 | Example 27 | Example 28 | Example 29 | Comparative Example 4 | Comparative Example 5 | Comparative Example 6 |
|---|---|---|---|---|---|---|---|---|---|---|---|---|
| Macromonomer (A) | ELVACITE | 40 | 40 | 40 | 40 | 40 | 40 | 40 | 40 | 40 | 40 | 40 |
| Vinyl monomer (B) | BA | 8000 | 8000 | 8000 | — | — | — | — | 8000 | 8000 | 8000 | — |
|  | St | — | — | — | 8000 | 8000 | 8000 | 8000 | — | — | — | 8000 |
| Organic iodine compound (C) | CP-I | 40 | 40 | 40 | — | — | — | 40 | 40 | — | — | — |
| Azo-based radical polymerization initiator (E) | AIBN | 10 | 5 | 1 | 80 | 80 | — | — | 0.1 | 10 | 10 | 80 |
|  | V-40 | — | — | — | — | — | 40 | 20 | — | — | — | — |
|  | V-65 | — | — | — | — | — | — | — | — | — | — | — |
| Iodine (I$_2$) |  | — | — | — | 20 | 20 | 20 | — | — | — | — | — |
| [Q]/[P] |  | 0 | 0 | 0 | 0.25 | 0.25 | 0.5 | 0 | 0 | 0 | 0 | 0 |
| Solvent [% by mass] | Butyl acetate | — | — | — | — | 50 | — | — | — | — | — | — |
|  | Toluene | — | — | — | — | — | — | — | — | — | — | — |
| Polymerization temperature Tp [° C.] |  | 80 | 80 | 80 | 80 | 80 | 110 | 110 | 80 | 110 | 80 | 80 |
| Polymerization time [hour] |  | 3 | 3 | 6 | 6 | 6 | 3 | 3 | 6 | 24 | 6 | 6 |
| Tp − T$_{10}$ [° C.] |  | 15 | 15 | 15 | 15 | 15 | 22 | 22 | 15 | 45 | 15 | 15 |
| Number-average molecular weight (Mn) |  | 22900 | 29000 | 14300 | 15000 | 5900 | 13000 | 13000 | 2900 | 27000 | 24000 | 22000 |
| Molecular weight distribution (Mw/Mn) |  | 2.4 | 2.5 | 3.3 | 1.8 | 1.7 | 1.7 | 1.5 | 2.0 | 4.6 | 4.6 | 4.8 |
| Monomer conversion rate [%] |  | 94 | 95 | 71 | 93 | 52 | 75 | 74 | 3 | >99 | 83 | 91 |

*All amounts excluding the solvent are molar equivalent numbers (eq).

Next, regarding the block copolymer contained in each block copolymer composition obtained in Examples 4 and 9 and Comparative Example 1, an exponential term a obtained from a slope of the Mark-Houwink-Sakurada plot is shown in Table 5.

Furthermore, results of time tracking of the amounts of the "macromonomer (A)" and the "macromonomer (B') containing the vinyl monomer (B) as a constitutional unit" during the polymerization reactions in Examples 4 and 9 are shown in Table 6.

TABLE 5

|  | Exponential term a (slope of Mark-Houwink-Sakurada plot) |
|---|---|
| Example 4 | 0.55 |
| Example 9 | 0.59 |
| Comparative Example 1 | 0.48 |

TABLE 6

|  |  | Example 4 |  |  |  |  |  | Example 9 |  |  |  |  |  |
|---|---|---|---|---|---|---|---|---|---|---|---|---|---|
| Polymerization time | Hour | 0 | 2 | 4 | 8 | 16 | 24 | 0 | 2 | 4 | 8 | 16 | 24 |
| Macromonomer (A) | % by mole | 100 | 82 | 62 | 41 | 16 | 0 | 100 | 92 | 82 | 56 | 40 | 15 |
| Macromonomer (B') containing vinyl monomer (B) as constitutional unit | % by mole | 0 | 13 | 29 | 27 | 16 | 0 | 0 | 10 | 19 | 23 | 27 | 15 |

From Table 5, it can be seen that each block copolymer composition of Examples 4 and 9 and Comparative Example 1 has an exponential term a of 0.7 or less and a smaller value of a than that of a linear polymer (a>0.7) having a typical flexible chain, and the block copolymer contained in the block copolymer composition has a branched structure. That is, these block copolymer compositions contain, as a main component, a block copolymer in which at least one block has a branched structure. It is suggested that in Comparative Example 1, a is smaller and branching further occurs in comparison with Examples 4 and 9. Also in the other Examples produced in the same manner as in Examples 4 and 9, similarly, it is considered that the block copolymer contained in each block copolymer composition has a branched structure.

In addition, as a result of $^{13}$C-NMR measurement on the block copolymer compositions of Examples 4 and 9, a quaternary carbon adjacent methine group was detected (at 38 to 41 ppm), and it could be confirmed that in the block copolymers contained in these compositions, at least one block had a branched structure. Moreover, in both of Examples 4 and 9, from the peak intensity of the quaternary carbon adjacent methine group, it could be confirmed that the block copolymer had four branched chains on average per molecule. Also in the other Examples produced in the same manner as in Examples 4 and 9, similarly, it is considered that the block copolymer contained in each block copolymer composition has a branched structure in at least one block and has about two to seven branched chains.

In addition, as shown in Table 6, formation and consumption of the macromonomer (B') having a constitutional unit derived from the vinyl monomer (B) in the polymerization process could be confirmed. That is, since the block copolymer contained in each block copolymer composition of Examples 4 and 9 has a branched structure in a block having a constitutional unit derived from the vinyl monomer (B) and both of the main chain and the branched chain consist of a constitutional unit derived from the vinyl monomer (B), it is understood that the main chain and the branched chain have the same constitutional unit. Also in the other Examples produced in the same manner as in Examples 4 and 9, similarly, it is considered that the block having a constitutional unit derived from the vinyl monomer (B) has a branched structure and the main chain and the branched chain of the block have the same constitutional unit.

From Tables 2 to 4, it can be seen that the molecular weight distributions Mw/Mn of all of the block copolymer compositions in respective Examples are within an appropriate range (1.5 to 3.4). Moreover, when the number-average molecular weight Mn is high to some extent, the monomer conversion rate is also high.

Each block copolymer composition obtained according to the present Examples has a phase structure which is controlled to a high degree, exhibits the favorable solubility and melt viscosity, and can be used as a resin additive, a dispersant, a coating composition, and a lithography polymer. That is, the effect of the block copolymer composition of the present invention was supported by Examples.

On the other hand, each block copolymer composition obtained in Comparative Examples 1 and 3 to 6 had a large molecular weight distribution Mw/Mn and thus could not be sufficiently controlled. In the copolymer composition shown in Comparative Example 1, the formation of a branched structure is suggested from Table 5, but since a is smaller, branching further occurs, and Mw/Mn is larger in comparison with Examples, the phase structure is less likely to be controlled and the composition is not preferred for application such as a dispersant and a resin additive.

In Comparative Example 2, polymerization did not proceed, and thus a block copolymer composition was not obtained.

What is claimed is:

1. A block copolymer composition, comprising:
a block copolymer in which constitutional units of all blocks are derived from vinyl monomers, at least one block has a branched structure, and a main chain and a branched chain consist of the same constitutional unit, wherein a constitutional unit of at least one block is derived from a methacrylate-based monomer or an acrylate-based monomer.

2. The composition of claim 1, wherein the block copolymer has a molecular weight distribution (Mw/Mn) is in a range of from 1.5 to 3.4.

3. The composition of claim 1, wherein the block copolymer has a number-average molecular weight Mn of 3,000 or more.

4. The composition of claim 1, wherein the block copolymer has an iodine atom at a terminal of a main chain.

5. The composition of claim 1, wherein the block copolymer has a number-average molecular weight Mn of 3,000 or more, and
wherein the block copolymer has a molecular weight distribution (Mw/Mn) is in a range of from 1.5 to 3.4.

6. A block copolymer composition, comprising:
a block copolymer in which constitutional units of all blocks are derived from vinyl monomers, at least one block has a branched structure, and a main chain and a branched chain consist of the same constitutional unit, wherein the block copolymer has an iodine atom at a terminal of a main chain.

7. The composition of claim 6, wherein the block copolymer has a molecular weight distribution (Mw/Mn) is in a range of from 1.5 to 3.4.

8. The composition of claim 6, wherein the block copolymer has a number-average molecular weight Mn of 3,000 or more.

9. The composition of claim 6, wherein a constitutional unit of at least one block is derived from a methacrylate-based monomer or an acrylate-based monomer, and
wherein the block copolymer has a molecular weight distribution (Mw/Mn) is in a range of from 1.5 to 3.4.

10. A block copolymer composition, comprising:
a block copolymer,
wherein the block copolymer composition is obtained by polymerizing a polymerizable composition comprising a macromonomer (A) of formula (I)

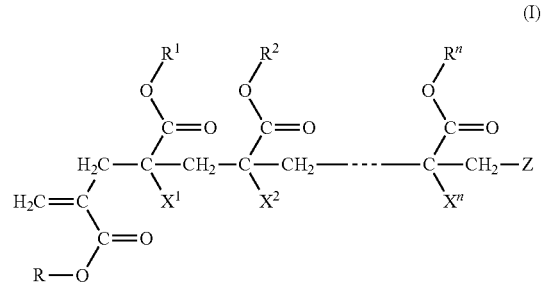

R and $R^1$ to $R^n$ each being independently H, an alkyl group, a cycloalkyl group, an aryl group, or a heterocyclic group, Z being H or a group derived from a radical polymerization initiator, $X^1$ to $X^n$ each being independently H or a methyl group, and n being an integer in a range of from 2 to 10,000,
a vinyl monomer (B), and
an organic iodine compound (C),
wherein the block copolymer has a block derived from the vinyl monomer (B) having a branched structure, and a main chain and a branched chain consist of the same constitutional unit.

11. The composition of claim 10, wherein the block copolymer has a block derived from the vinyl monomer (B) having a branched structure, and
wherein the block copolymer has a molecular weight distribution in a range of from 1.5 to 3.4.

12. The composition of claim 10, wherein the block copolymer has an iodine atom at a terminal of a main chain.

13. The composition of claim 10, wherein the vinyl monomer (B) is at least one monomer selected from the group consisting of a styrene-based monomer, a methacrylate-based monomer, and an acrylate-based monomer.

14. A method for producing the block copolymer composition of claim 10, the method comprising:
polymerizing a polymerizable composition which comprises iodine, an azo-based radical polymerization initiator (E), the vinyl monomer (B), and the macromonomer (A) of formula (I).

15. The method of claim 14, wherein the polymerizable composition further comprises a catalyst (D).

16. The method of claim 14, satisfying Expression (i) and/or (ii):

$$0<[Q]/[P]<0.60 \quad \text{(i)},$$

wherein [P] being a molar equivalent number of the azo-based radical polymerization initiator (E), and [Q] being a molar equivalent number of the iodine, and $$0<Tp-T_{10}<40 \quad \text{(ii)},$$

Tp being a polymerization temperature (° C.) at which the polymerizable composition is polymerized, and $T_{10}$ being a 10-hour half-life temperature (° C.) of the azo-based radical polymerization initiator (E).

17. A method for producing the block copolymer composition of claim 10, the method comprising:
polymerizing a polymerizable composition which comprises the organic iodine compound (C), the vinyl monomer (B), and the macromonomer (A) of formula (I).

18. The method of claim 17, wherein the polymerizable composition further comprises
catalyst (D) and/or
an azo-based radical polymerization initiator (E).

19. The method of claim 17, wherein the vinyl monomer (B) is at least one monomer selected from the group consisting of a styrene-based monomer, a methacrylate-based monomer, and an acrylate-based monomer.

20. The method of claim 18, wherein the catalyst (D) is at least one selected from the group consisting of:
catalyst (D1): a non-metal compound comprising a halide ion and a non-metal atom which is in a cationic state and forms an ionic bond with the halide ion,
catalyst (D2): a compound comprising a carbon atom and at least one halogen atom directly bonded to the carbon atom, or a hydrocarbon compound serving as a precursor of the compound,
catalyst (D3): an organic compound comprising a nitrogen atom, a phosphorus atom, a sulfur atom, or an oxygen atom and having redox properties,
catalyst (D4): a compound selected from the group consisting of ethylene, acetylene, oligoacetylene, polyacetylene, fullerene, carbon nanotube, and derivatives thereof,
catalyst (D5): an alkali metal halide compound or an alkaline earth metal halide compound, and
catalyst (D6): a compound selected from the group consisting of a phosphorus compound, a nitrogen-containing compound, and an oxygen-containing compound other than the catalysts (D1) to (D5).

* * * * *